(12) United States Patent
Sarkar et al.

(10) Patent No.: US 8,505,743 B2
(45) Date of Patent: Aug. 13, 2013

(54) SURFACE MODIFICATION OF POLYAMIDE REVERSE OSMOSIS MEMBRANES

(75) Inventors: Abhijit Sarkar, Midland, MI (US);
Petar R. Dvornic, Midland, MI (US);
Peter I. Carver, Midland, MI (US);
Joseph L. Rousseau, Saginaw, MI (US)

(73) Assignee: Michigan Molecular Institute, Midland, MI (US)

( * ) Notice: Subject to any disclaimer, the term of this patent is extended or adjusted under 35 U.S.C. 154(b) by 40 days.

(21) Appl. No.: 13/263,711

(22) PCT Filed: Apr. 8, 2010

(86) PCT No.: PCT/US2010/001058
§ 371 (c)(1),
(2), (4) Date: Oct. 7, 2011

(87) PCT Pub. No.: WO2010/117460
PCT Pub. Date: Oct. 14, 2010

(65) Prior Publication Data
US 2012/0024789 A1 Feb. 2, 2012

Related U.S. Application Data

(60) Provisional application No. 61/212,206, filed on Apr. 8, 2009.

(51) Int. Cl.
*B03B 11/00* (2006.01)
*B01D 39/00* (2006.01)
*B01D 67/00* (2006.01)

(52) U.S. Cl.
USPC ............... 210/490; 210/500.27; 210/500.38; 210/652; 264/48; 264/49

(58) Field of Classification Search
USPC .......... 210/500.38, 651, 500.27, 490, 500.37; 264/48, 49, 41; 428/474, 420, 475.2; 427/340; 528/33, 15; 525/474
See application file for complete search history.

(56) References Cited

U.S. PATENT DOCUMENTS

| | | | |
|---|---|---|---|
| 5,833,854 A * | 11/1998 | Zwijnenburg et al. | ... 210/500.37 |
| 6,384,172 B1 | 5/2002 | Dvornic et al. | |
| 6,534,600 B2 | 3/2003 | Dvornic et al. | |
| 6,646,089 B2 | 11/2003 | Dvornic et al. | |
| 7,470,369 B2 * | 12/2008 | Diallo | ........................... 210/650 |
| 7,918,349 B2 * | 4/2011 | Mickols et al. | ........... 210/500.38 |
| 2001/0052486 A1 * | 12/2001 | Danger et al. | ................ 209/728 |
| 2002/0020669 A1 * | 2/2002 | Kim et al. | ...................... 210/656 |
| 2004/0156933 A1 * | 8/2004 | McNamara et al. | ... 424/DIG. 16 |

(Continued)

OTHER PUBLICATIONS

Murakami, S., et al., Polymer 43, 2117-2120 (2002).

(Continued)

*Primary Examiner* — Ana Fortuna
(74) *Attorney, Agent, or Firm* — Technology Law PLLC; Karen L. Kimble

(57) ABSTRACT

The present invention relates to surface modification of reverse osmosis membranes to introduce antifouling properties without compromising the separation properties of the original membranes. This approach utilizes: providing a coated membrane surface having enhanced hydrophilic characteristics that prevents the biofoulants from settling; have a surface that consists of hydrophilic brushes that unsettle any biofoulants that get through; and having antimicrobial ions present in the membrane coatings and able to remove or minimize any remaining biofoulants without leaching into the permeate. These coatings are made using dendritic polymers such as hyperbranched polymers or dendrimers.

11 Claims, 9 Drawing Sheets

(56) References Cited

U.S. PATENT DOCUMENTS

| | | | |
|---|---|---|---|
| 2006/0021938 A1* | 2/2006 | Diallo | 210/638 |
| 2007/0202071 A1* | 8/2007 | Morvan et al. | 424/70.17 |
| 2007/0207186 A1* | 9/2007 | Scanlon et al. | 424/424 |
| 2007/0251883 A1* | 11/2007 | Niu | 210/653 |
| 2007/0254006 A1* | 11/2007 | Loose et al. | 424/423 |
| 2008/0105611 A1* | 5/2008 | Collias et al. | 210/500.25 |
| 2008/0199619 A1* | 8/2008 | Ryu et al. | 427/340 |
| 2008/0312349 A1* | 12/2008 | Yeager et al. | 521/27 |
| 2009/0001802 A1* | 1/2009 | Diallo et al. | 299/5 |
| 2009/0184047 A1* | 7/2009 | Thayumanavan et al. | 210/500.34 |
| 2009/0223896 A1* | 9/2009 | Diallo | 210/638 |
| 2011/0034422 A1* | 2/2011 | Kannan et al. | 514/152 |
| 2012/0035332 A1* | 2/2012 | Diallo et al. | 525/422 |
| 2012/0043275 A1* | 2/2012 | Montemagno et al. | 210/500.29 |
| 2012/0219496 A1* | 8/2012 | Tsourkas et al. | 424/1.65 |

OTHER PUBLICATIONS

Toki, S., et al., Macromolecules 35, 6578-6584 (2002).
Toki, S., et al., Polymer 44, 6003-6011 (2003).
Toki, S., et al., Macromolecules 36, 5915-5917 (2003).
Trabelsi, S., et al., Macromolecules 36, 7624-7639 (2003).
Dvornic, P. R., et al., Polym. Prepn. 45(1), 585-586 (2004).
Dvornic, P.R. and Meier, D.J., Chapter 16 in Silicon-Containing Dendritic Polymers, Dvornic, P.R. and Owen, M.J. (Eds.), Springer, 2009, pp. 401-419.
Newkome, G.R., et al., Chem. Rev. 99, 1689-1746 (1999).
Tomalia, D. A. and Dvornic, P. R., in "The Polymeric Materials Encyclopedia," vol. 3, Salamone, J.C. (ed.), CRC Press Inc., Boca Raton, p. 1814-1830 (1996).
DvVornic, P. R., et al., Curr. Opin. Colloid Interface Sci. 1, 221-235 (1996).

* cited by examiner

A

B

SURFACE MODIFICATION OF POLYAMIDE REVERSE OSMOSIS MEMBRANES

CROSS REFERENCE TO RELATED APPLICATIONS

This application claims priority from all the following listed applications and is a national phase application from International Application PCT/US2010/001058, filed 8 Apr. 2010, which claims benefit from U.S. Application 61/212,206, filed 8 Apr. 2009.

FEDERALLY SPONSORED RESEARCH STATEMENT

This invention was made with Government support from DARPA under Award No. W911SR-05-C-0026 and from the U.S. Army under Award No. W911SR-07-C-0036, both granted to Michigan Molecular Institute. The Government has certain rights in this invention.

FIELD OF THE INVENTION

This invention concerns surface modification of reverse osmosis membranes with hydrophilic dendritic polymers, particularly dendrimers and hyperbranched polymers.

BACKGROUND OF THE INVENTION

During the past two decades, the reverse osmosis (RO) process has gained extensive attention in the purification and preparation of drinking and ultrapure water for electronic and pharmaceutical industries and separation of organics from aqueous streams [see, for example, Murakami, S., et al., *Polymer* 43, 2117 (2002); Toki, S., et al., *Macromolecules* 35, 6578 (2002); Toki, S., et al., *Polymer* 44, 6003 (2003)]. However, successful utilization of RO technology has been hampered by membrane fouling, which creates a major obstacle for membrane applications from both technological and economic aspects of process utilization [see Toki, S., et al., *Macromolecules* 36, 5915 (2003); Trabelsi, S., et al., *Macromolecules* 36, 7624 (2003)]. Therefore, there is a growing interest in surface modification of existing RO membranes to introduce properties that markedly reduce fouling, specifically biofouling, while retaining permeate water flux and rejection characteristics of the commercially available membranes.

Commercial RO membranes are typically made of thin-film-composite aromatic polyamides for which the microorganism-induced biofilm formation on the surface is a major problem. This biofouling often results in up to 30-40% permeate flux declines, requiring for compensation increases in the operating pressures as high as 50%, regular cleaning by chlorine treatment and even complete replacements of the filtration module every 2-3 years. Table 1 below summarizes the salient features of representative commercially available RO membranes and shows that all of the polyamide and polyethersulfone ones are prone to biofouling.

TABLE 1

Selected properties of some commercial RO membranes

| Membrane | HR98PP | CA995PE | SEPA-MS05 | SEPA-SS1C | DESAL-3B | Elix ® 3 RO Cartridge |
|---|---|---|---|---|---|---|
| Manufacturing company | Dow/FilmTec | Dow/FilmTec | GE-Osmonics | GE-Osmonics | Desalination Systems, Inc. | Millipore |
| Composition | Polyamide thin film composite | Diacetate/ polyester | Polyamide | Cellulose acetate | Polyether- sulfone | Polyamide thin film composite |
| Typical NaCl rejection (%) | >97.5 | >95 | >98 | >98 | 98.5 | 94-99 |
| Chlorine tolerance | Low | Low | Low | Low | Low | Low |
| pH range | 2-11 | 2-8.5 | 3-11 | 2-8 | 4-11 | 4-11 |
| Tendency for biofouling | High | Low | High | Low | High | High |
| Maximum operating pressure (psi) | 870 | 1015 | 1015 | 1015 | 650 | 65 |
| Maximum operating temp (° C.) | 60 | 35 | 80 | 50 | 50 | 35 |

In fact, apart from the cost of energy to run the high-pressure pumps, membrane fouling is the single most important factor that controls the cost of RO water purification unit (ROWPU) operations. Since the maintenance and remediation expenses represent about 30% of the total operating cost, a new generation of membranes with inherent anti-fouling capability is urgently needed.

Clearly, it would be advantageous to provide an RO membrane that resists biofouling without compromising the separation properties of the membranes.

BRIEF SUMMARY OF THE INVENTION

This invention relates to surface modification of reverse osmosis membranes to introduce antifouling quality without compromising their separation properties. Specifically, this invention provides a crosslinked hydrophilic coating on a surface of a reverse osmosis membrane wherein the coating comprises hydrophilic dendritic polymers, wherein the dendritic polymer (a) is crosslinked to form a network, and (b) is modified with hydrophilic linear chains to form polymer brushes in the network. Furthermore, this coating may have antimicrobial metal ions chelated into the polymer network.

This approach utilizes: providing a coated membrane surface having enhanced hydrophilicity that prevents the biofoulants from settling; having a coated membrane surface that consists of hydrophilic brushes that unsettle any biofoulants that get through; and having antimicrobial and biofilm-preventing ions (such as silver, zinc, or potassium) present in the coatings capable of neutralizing any remaining biofoulants. The coatings for the membranes are made using hydrophilic dendritic polymers. Examples of such dendritic polymers are hyperbranched polymers, such as hyperbranched polyureas, hyperbranched polyamides, hyperbranched polyalkylesters or hyperbranched polyesteramides, or dendrimers, such as PAMAM dendrimers, particularly its generation 2 (G2), poly (propyleneimine) dendrimers, or Priostar™ dendrimers.

Polyethylene glycol, polyvinyl alcohol or polyacrylamide may be used to either crosslink the dendritic polymers into a network or form brushes which aid in preventing biofilm formation. Silver, zinc or potassium ions may be chelated into the polymer network to further aid in preventing biofilm formation. Specifically included are coatings on a polyamide surface of an RO membrane which comprise a hyperbranched polymer or a PAMAM dendrimer that are hydrophilic and crosslinked with polyethylene glycol to form a network and when desired also brushes.

BRIEF DESCRIPTION OF THE DRAWINGS

FIG. 2A: a dense-shell model of a high generation tridendron dendrimer. FIG. 2B: structural formula of a generation 2 (G2) tetradendron. PAMAM dendrimer.

DETAILED DESCRIPTION OF THE INVENTION

Glossary

The following terms as used in this application are to be defined as stated below and for these terms, the singular includes the plural.

"$Ag^+$ PAMAM (G2) nanocomplex" means PAMAM (G2) dendrimer with intramoluclarly complexed $Ag^+$ ions "$Ag^+$ PAMAM (G2)-PEG network" means a network prepared by crosslinking $Ag^+$ PAMAM (G2) nanocomplex precursor with difunctional telechelic PEG "AWCA" means advancing water contact angle "DGE" means diglycidyl ether "DI water" means deionized water "DSC" means Differential Scanning calorimetry "EDC" means 1-ethyl-3-(3-dimethylaminopropyl)carbodiimide hydrochloride "eq." means equivalent(s)

"FTIR" means Fourier Transform Infrared spectroscopy

"g" means gram(s)

"HBP" means hyperbranched polymer; this is a specific class of dendritic polymer and excludes dendrimers, dendrons, and dendrigrafts "HB-PA" means HB polyamide with amino end groups "HB-Pamsuc" means HB polyamide with a succinate spacer "HB-PU" means FIB polyurea "HBP-PEG network" means a network prepared by crosslinking a HBP with difunctional telechelic PEG "hr" means hour(s)

"ICP-OES" means inductively coupled plasma optical emission spectrometry

"MALDI-TOF" means matrix-assisted laser desorption ionization time of flight mass spectroscopy "MeOH" means methanol "min" means minute(s)

"mL" means milliliter(s)

"$M_n$" means number average molecular weight

"$M_w$" means weight average molecular weight

"MPEG" means methoxypoly(ethyleneglycol), shown in Scheme 2

"MWCO" means molecular weight cut off

"NHS-PEG" means N-hydroxysuccinimide polyethylene glycol

Figure 1:
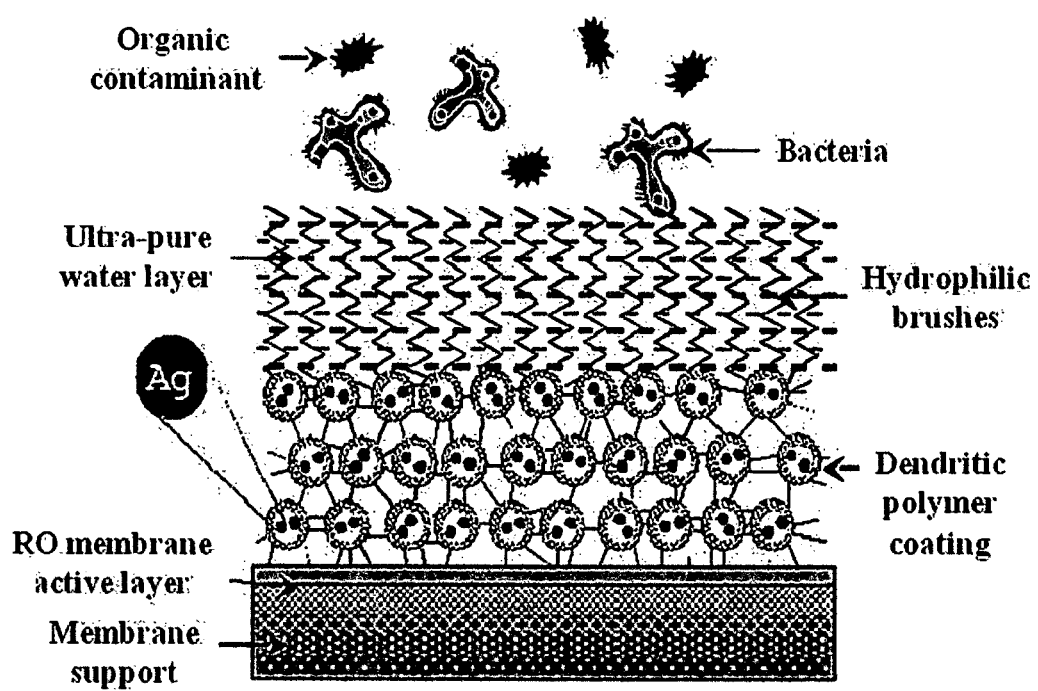
FIG. 1 is a schematic representation of the proposed antifouling dendritic polymer coating on the active layer of a standard asymmetric RO membrane. The coating is a crosslinked honeycomb-like network of dendritic cells (represented by large circles with pearly rims) created from highly hydrophilic PAMAM dendrimers or hyperbranched polyamides, HB-PA, with attached hydrophilic linear PEG tethered chains/brushes (top). Note that dendritic cells are crosslinked by linear PEG segments (represented by straight lines connecting the circles) and that they contain encapsulated biofilm deterrents (in this Figure as $Ag^+$ cations, represented by blue dots). This schematic is not to scale: in reality, the thickness of the coating will be less than 5% of the thickness of the membrane substrate.

"NMR" means Nuclear Magnetic Resonance
"PAMAM" means polyamidoamine dendrimers with primary amine terminal groups
"PAMAM (G2)-PEG" means a star-like product having PEG chains attached to a PAMAM (G2) core
"PAMAM (G2)-PEG network" means a network prepared by crosslinking PAMAM (G2) with difunctional telechelic PEG
"PAMAM (G2)-PEG brush-PEG network" means a network prepared by crosslinking PAMAM (G2)-PEG star-like precursors with difunctional telechelic PEG
"PEG" means polyethyleneglycol
"PEG-DGE" means telechelic diglycidylether-functionalized PEG
"RO" means reverse osmosis
"RT" means ambient temperature or room temperature, from about 22 to about 25° C.
"SEM" means Scanning Electron Microscopy
"sec" means second(s)
"SEC" means size exclusion chromatography
"TGA" means thermogravimetric analysis
"TREN" means tris(2-aminoethyl)amine
"UF" means ultrafiltration The present invention provides surface modification of RO membranes to introduce antifouling properties without compromising their separation properties. This modification is provided by coating the active (e.g., polyamide) side of the membranes with coatings that consist of the following three main structural characteristics (as shown in FIG. 1). First, the membrane surface, due to its enhanced hydrophilic character, prevents most of the biofoulants from settling. Second, hydrophilic brushes on the membrane surface unsettle any biofoulants that attempt to get through. Third, antimicrobial ions in the surface coatings provide biocidal characteristics to neutralize any remaining biofoulants.

Figure 2:
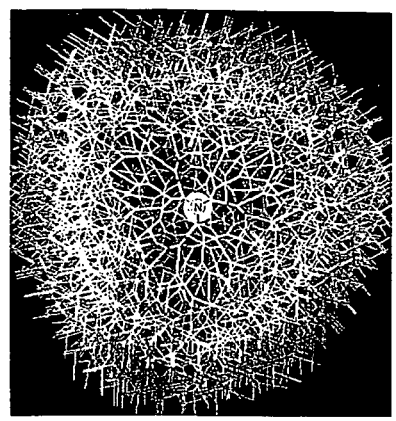
FIG. 2 is a schematic representation of dendrimer branching topology.
Figure 2:
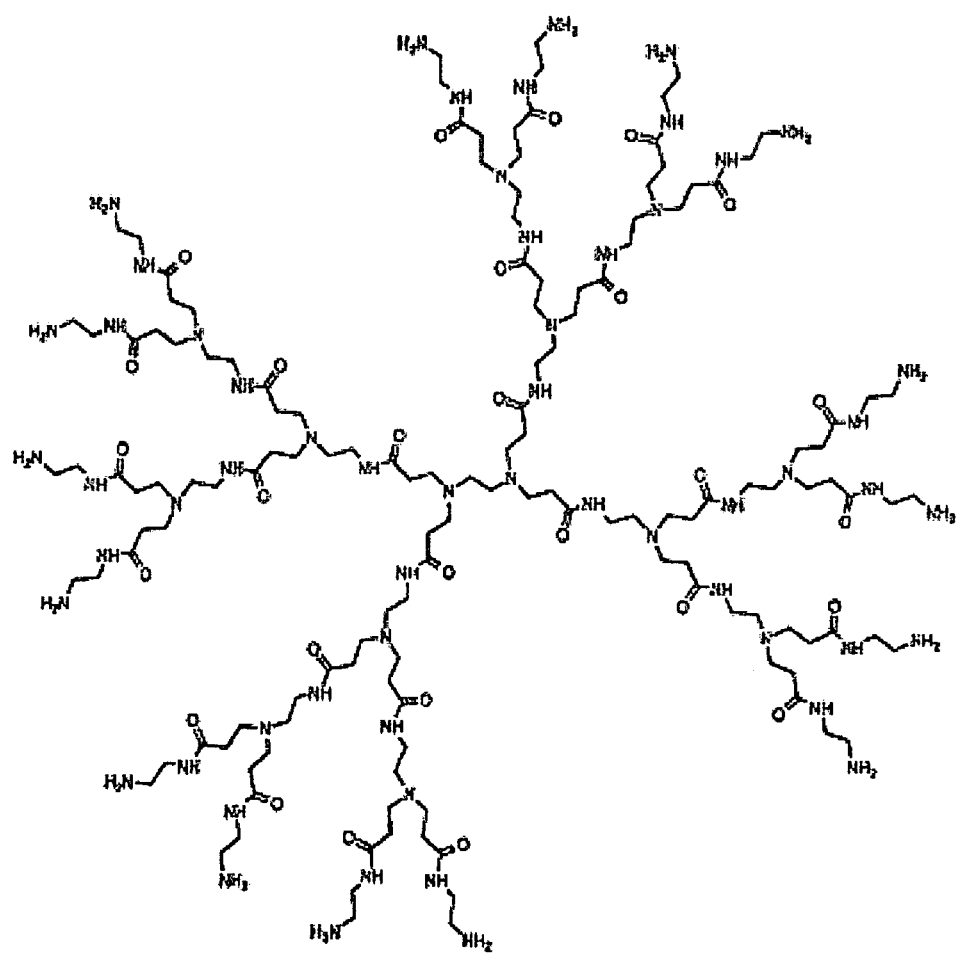
Figure 3:
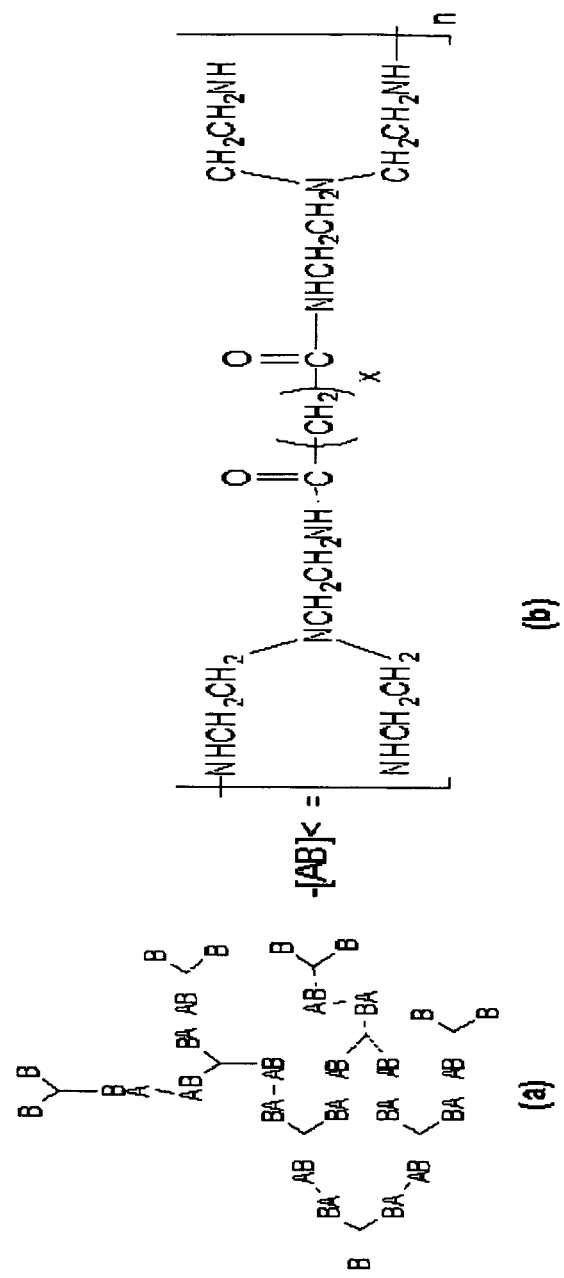
FIG. 3 shows the molecular architecture of (a) a generalized hyperbranched polymer $-[AB]_n<$, and (b) a representative example of a HB-PA.

These coatings are prepared from either dendrimers or HBPs (illustrated by FIGS. 2 and 3, respectively) that consist of highly branched, tree-like molecules and possess specific combinations of properties that are not common to any other class of traditional macromolecular architectures as described in U.S. Pat. Nos. 6,384,172; 6,534,600; and 6,646,089; and Dvornic, P. R., et al., *Polym. Prepn.* 45(1), 585 (2004). Among others, these properties include: (a) nanoscopic molecular sizes (that range between 1 nm and 10 nm in diameter and make these polymers ideal building blocks for synthetic film nanotechnology); (b) very high density of molecular functionality (i.e., tens or hundreds of end-groups per molecule that can be either reactive or inert); (c) ability to encapsulate smaller molecular weight species within their highly branched nanoscopic molecular interiors; and (d) significantly lower viscosities than those of linear polymers of the same composition and comparable molecular weights (hence, much easier and less energy consuming to process).

The HBPs of this invention can be made by several different synthetic strategies of which the most versatile and economical is the so-called bimolecular, non-linear polymerization (BMNLP) developed recently for the preparation of a wide variety of different patented HBP compositions (see Dvornic, P. R. and Meier, D. J., Chapter 16 in Silicon-Containing Dendritic Polymers, Dvornic, P. R. and Owen, M. J. (Eds.), Springer, 2009, pp. 401-419).

Of particular interest are cross-linked hyperbranched polymer networks (FIG. 4) in which HBPs of different chemical compositions can be combined to tailor-make honeycomb-like nano-domained 3D architectures. For example, in such networks, nucleophilic, hydrophobic polyamide (PA), polyurea (PU), polyalkylesters or polyesteramide HB nano-domains or bis(hydroxymethyl)propionic acid, containing functional groups such as antimicrobial or charged groups, can be embedded in a hydrophilic matrix, such as poly(ethylene glycol) (PEG), polyvinyl alcohol or polyacrylamide. Particularly preferred is poly(ethylene glycol) (PEG) as the brushes and/or the crosslinking agent.

Figure 5:
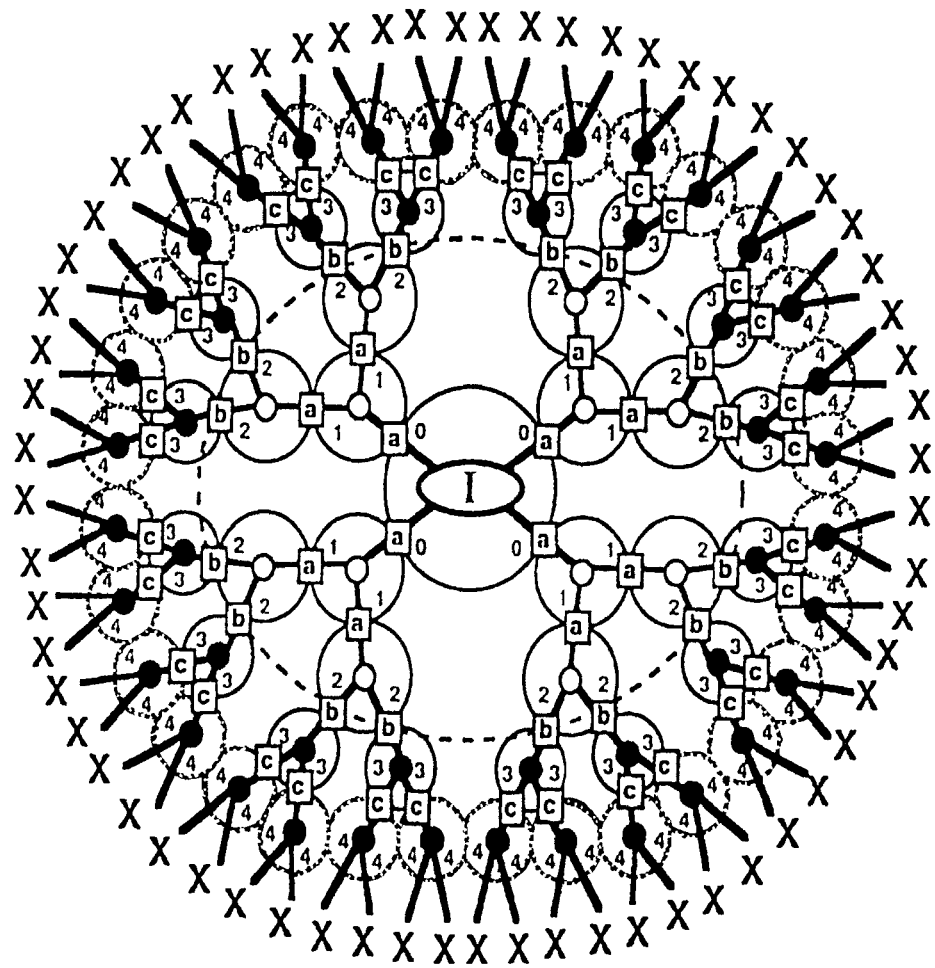
FIG. 5 is a generalized representation of a tetradendron dendrimer architecture and its constitutive building blocks. An ellipse with an "I" in the center denotes the core. The big circle in the center with four small zeros denotes a generation zero part of the structure. Medium size circles denote dendritic branch cells with Arabic numbers indicating their generation level and small letters in squares denote connecting bonds between the adjacent cells. Small circles (both filled and unfilled) in the center of each cell represent branch junctures which in this case are all of 1→2 branching functionality. Symbols X represent end-groups, which may be chemically reactive or unreactive but must not repel the membrane surface.

Another polymer type, namely dendrimers such as PAMAM dendrimers, poly(propyleneimine) dendrimers, or Priostar™ dendrimers (PEHAM dendrimers), can also be used. Preferred are the PAMAM dendrimers. Dendrimers are a unique class of polymers which play an important role in the emerging field of nano-technology [see Newkome, G. R., et al., *Chem. Rev.* 99 1689 (1999); Dvornic, P. R. et al., in "*The Polymeric Materials Encyclopedia*," vol. 3, Salamone, J. C. (ed.), CRC Press Inc., Boca Raton, p. 1814, 1996]. They are three-dimensional globular polymers with compact tree-like molecular structure which provides an extremely high density of surface functionality that makes them excellent building blocks and carrier molecules at the nanometer level (see FIG. 2). They are composed of two or more dendrons emanating from a central core which can either be an atom or an atomic group. Their structure contains branch cells, which are of the following three types: a core (which represents a central juncture), interior cells and surface cells with chemically reactive or inert terminal surface groups (FIG. 5). The structure of the branch cells is determined by the nature of the contributing atoms, bond lengths and angles, directionality, conformational bond flexibility, and other characteristic properties. They can be either homogeneous or differ in their chemical structure, but each of them contains at least one branch juncture. Reactive surface groups (X in FIG. 5) may be used for continuation of dendritic growth or for modification of the dendrimer surface.

The process of dendrimer formation permits an exceptional degree of reaction control, which results in a very high degree of structural regularity. As a consequence, dendrimers show properties which are not typical for other types of polymers: very high isomolecularity (routinely better than $M_w/M_n=1.2$ even at very high generations), very well defined molecular size (increasing with generation number in regular increments of ~1 nm/generation), regular molecular shape, and unusually high chemical functionality, due to a large number of exo-presented surface groups per molecule [see Dvornic, P. R. et al., in "*The Polymeric Materials Encyclopedia*," vol. 3, Salamone, J. C. (ed.), CRC Press Inc., Boca Raton, p. 1814, 1996; Dvornic, P. R., et al., *Curr. Opin. Colloid Interface Sci.* 1, 221 (1996)]. Different generations of dendrimers may be used in this invention, such as PAMAM dendrimers G0 through G10, especially G0 through G4. A Generation 2 PAMAM [PAMAM (G2)] dendrimer (FIG. 2) was used for the present coatings but other dendrimer compositions and generations are also useful for this purpose.

Figure 4:
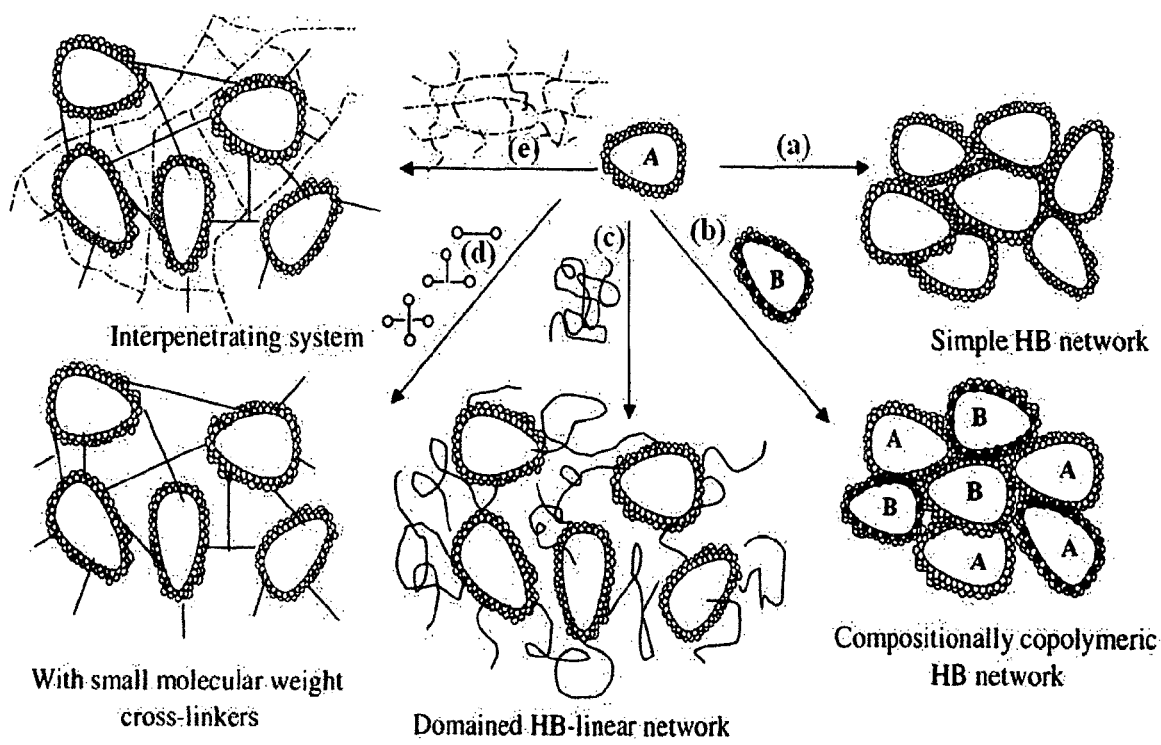
FIG. 4 illustrates the general types of nano-domained networks from hyperbranched (HB) polymer precursors. Blank egg-shaped contours represent HB molecules/domains, while small circles in pearl necklace-type formation represent their reactive or reacted end-groups. Reagents in the clockwise direction include: (a) HB polymer of composition A; (b) HB polymer of composition B; (c) linear polymer with reactive chain ends; (d) di-, tri- and tetra-functional small molecule reagents; (e) interpenetrating polymer network comprising one HB and one linear polymer network.

The high density of molecular functionality of dendritic polymers (e.g., the large number of X groups per dendrimer molecule in FIG. 5) permits their easy functionalization into multi-arm star-like polymers by the reaction with monofunctional chain reagents. If this conversion is not quantitative, i.e, if some X groups are purposely left unreacted, then these multi-arm star polymers can be further used for crosslinking into networks by reacting with appropriate difunctional reagents (as illustrated in FIG. 4 and in Scheme 7). In such networks, the star arms that are left free on the network surface can either collapse onto the surface or extend away from it, if their interactions with the outside environment are favorable. The latter situation is achieved if highly hydrophilic arms, such as PEG, polyacrylamide, polyvinyl alcohol or the like, are used and the networks are exposed to water environment. Such surfaces behave as molecular brushes wherein the extending chains generally have high Brown-ean mobility. The preferred chain lengths of such brushes may vary corresponding to the molecular weights of the monofunctional chain reagents from about 200 to about 5,000 g/mol, and the characteristic coating surface coverage may vary from 1% to 99% of the exposed dendritic precursor surface.

Although dendritic polymers can be crosslinked into dendritic polymer networks in a variety of ways, as illustrated for HBPs in FIG. 4, the preferred methods of crosslinking for this invention are shown by (c) and (d) of FIG. 4, specifically (c), where hydrophilic difunctional telechelic chain crosslinkers are used. The preferred crosslinker from this group is PEG, but polyacrylamide, polyvinyl alcohol, or other hydrophilic counterparts are also acceptable. Their chain lengths (i.e., molecular weights) may range from 100 to 10,000 g/mol, with preferred range being from 300 to 1,000 g/mol.

To test these RO coatings, the following procedures were done: (a) surface modifications of commercially available polyamide-based RO membranes with dendritic polymers, described above, were carried out where the coating thickness was optimized for the best separation properties and uniform pin-hole-free coverage, (b) evaluations of permeate flux and rejection selectivity of the coated membranes and (c) quantification of their hydrophilicity via contact angle measurements. In all cases, commercially available Film Tec's Extra Low Energy (XLE) RO membranes were used and coatings were prepared either from (PAMAM G2) dendrimers (FIG. 2B) or hyperbranched polyamides from TREN and dimethyl succinate, HB-Pamsuc (FIG. 3B). The dendritic polymers were crosslinked using telechelic diglycidylether-functionalized polyethyleneglycol (PEG-DGE) having Mµ=526. The brushes were formed reacting nanofunctional N-hydroxysuccimimide polyethyleneglycol (NHS-PEG) with either type of the dendritic polymers used, and $Ag^+$ was used as the encapsulated antimicrobial agent.

Processes for the preparation of the coating of the present invention are provided as a preferred method by the following Schemes. In a similar manner, other coatings within this invention may be prepared.

Starting Materials
Preparation of Dendritic Polymer Coatings
Synthesis of HB-PA with $NH_2$ End-Groups Starting from dimethyl succinate, tris(2-aminoethyl)amine, and TREN, the amine-terminated HB-PA were prepared as shown in Scheme 1 below. The reaction was carried out with an excess of TREN to obtain the primary amine end-groups. The HB-PA (HB-Pamsuc) had a $M_w$ of ~4000 as determined by SEC, and showed that it was stable up to about 200° C. by TGA analysis.

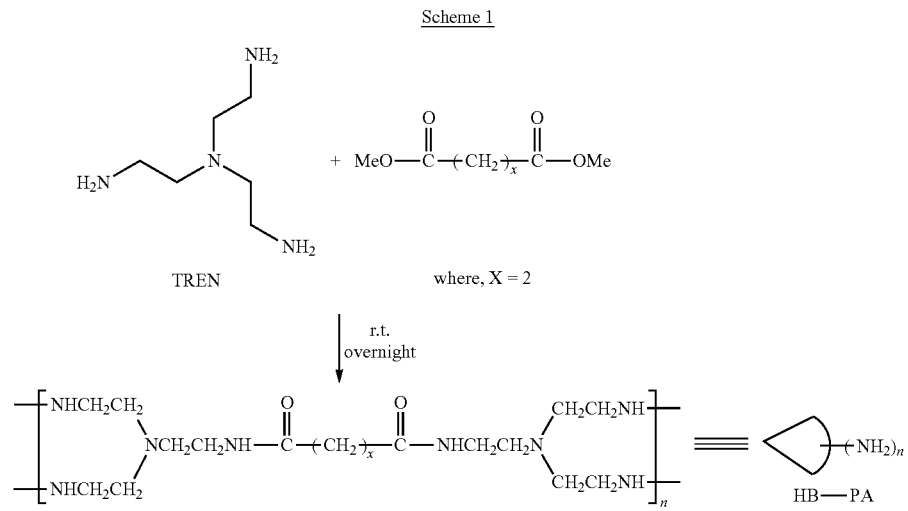

Scheme 1

Synthesis of NHS-PEG.

The synthesis of N-hydroxysuccinimide, NHS-PEG, is illustrated in Scheme 2 below. The reaction was monitored by FTIR (disappearance of —COOH group). The yield of the final product was 95%.

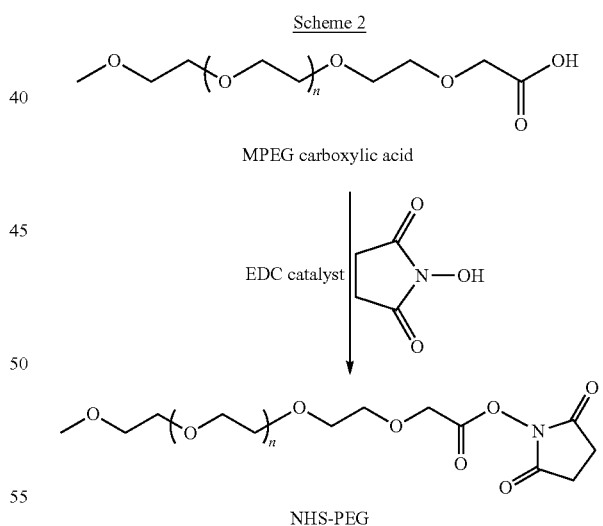

Scheme 2

Synthesis of PAMAM (G2)-PEG.

The synthesis of PAMAM (G2)-PEG is illustrated in Scheme 3 below. PAMAM (G2) contains sixteen exo-presented terminal amine groups. Of these, eight (50%) were functionalized by reacting with the NHS-PEG. The reaction occurred at RT and it was monitored by FTIR until the signals for ester groups completely disappeared. The product was purified by UF and the formation of PEG-functionalized PAMAM (G2) was confirmed by MALDI-TOF.

Scheme 3

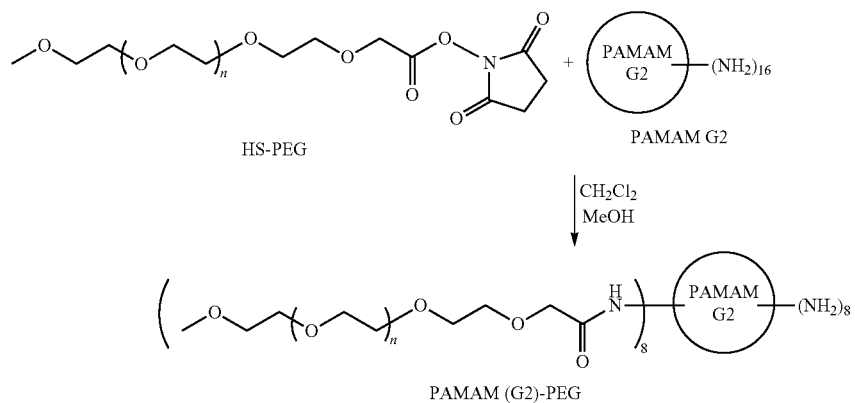

Preparation of HBP-PEG Network Coatings.

The reaction scheme for the formation of the HBP-PEG network coatings is shown in Scheme 4 below. Coating solutions were prepared with varying weight percents of HB-PA (Pamsuc) and stoichiometric equivalents of PEG-DGE in water. The network formation was in situ, as soon as the solution formed a thin coat on the membrane. Completion of the reaction took about 30 mins.

Scheme 4

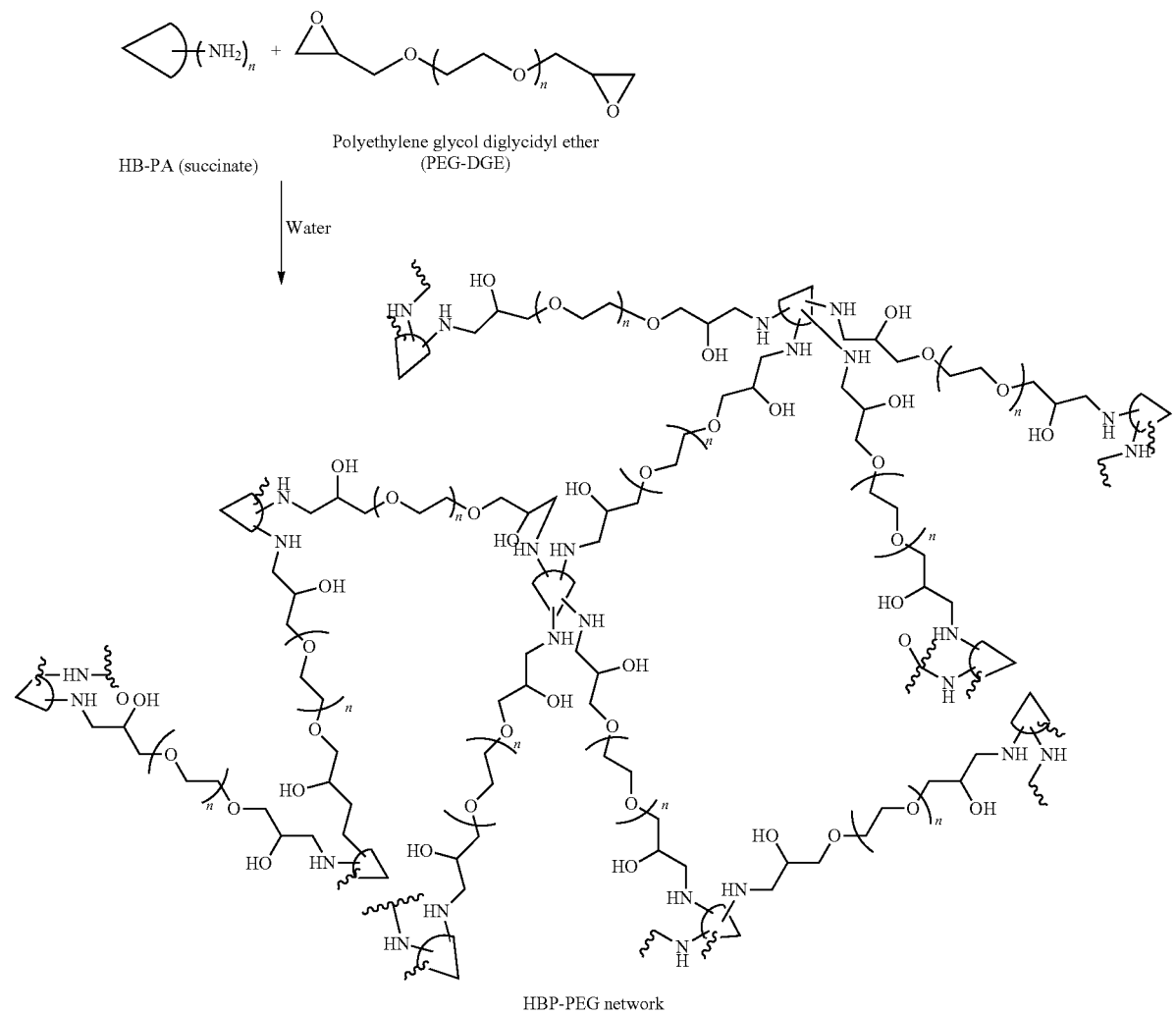

Preparation of PAMAM (G2)-PEG Network Coatings with No Free Amine Groups.

Coating solutions were prepared with varying weight percents of PAMAM G2 and stoichiometric equivalents of PEG-DGE in water. The network formed was in situ, as soon as the solution formed a thin coat on the membrane. Completion of the reaction took about 30 mins. The reaction scheme for the formation of the PAMAM (G2)-PEG network is shown in Scheme 5 below.

Preparation of PAMAM (G2)-PEG Network Coatings with Approx. 50% Free Amine Groups.

In another formulation, 50% of terminal $NH_2$ groups of the PAMAM (G2) dendrimer were reacted with PEG-DGE in water to provide a network coating which still contained 50% remaining free amino groups on the surface. The reaction scheme for the formation of PAMAM (G2)-PEG networks is shown in Scheme 6 below.

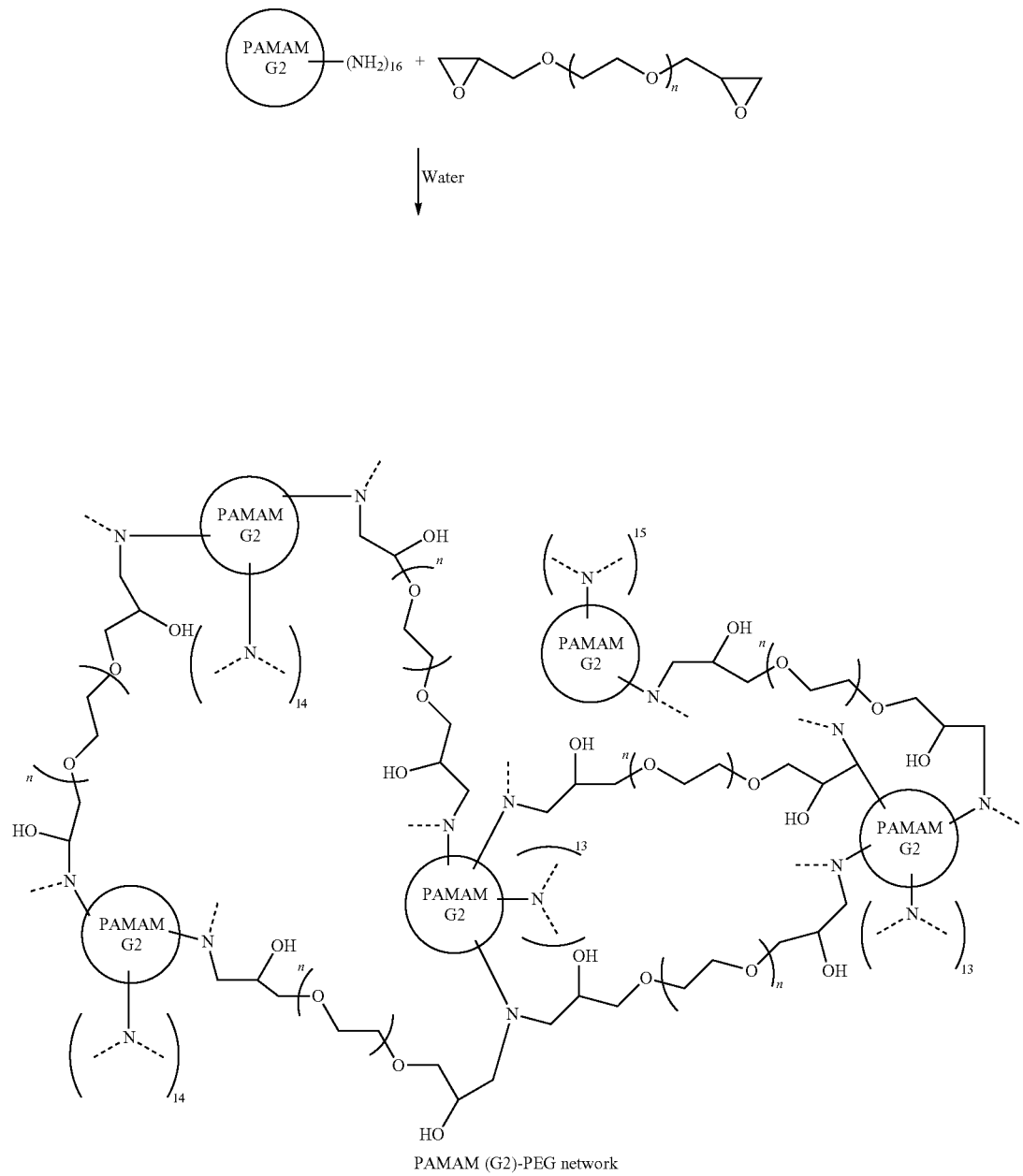

PAMAM (G2)-PEG network

----- = PEG network bonds

Scheme 6

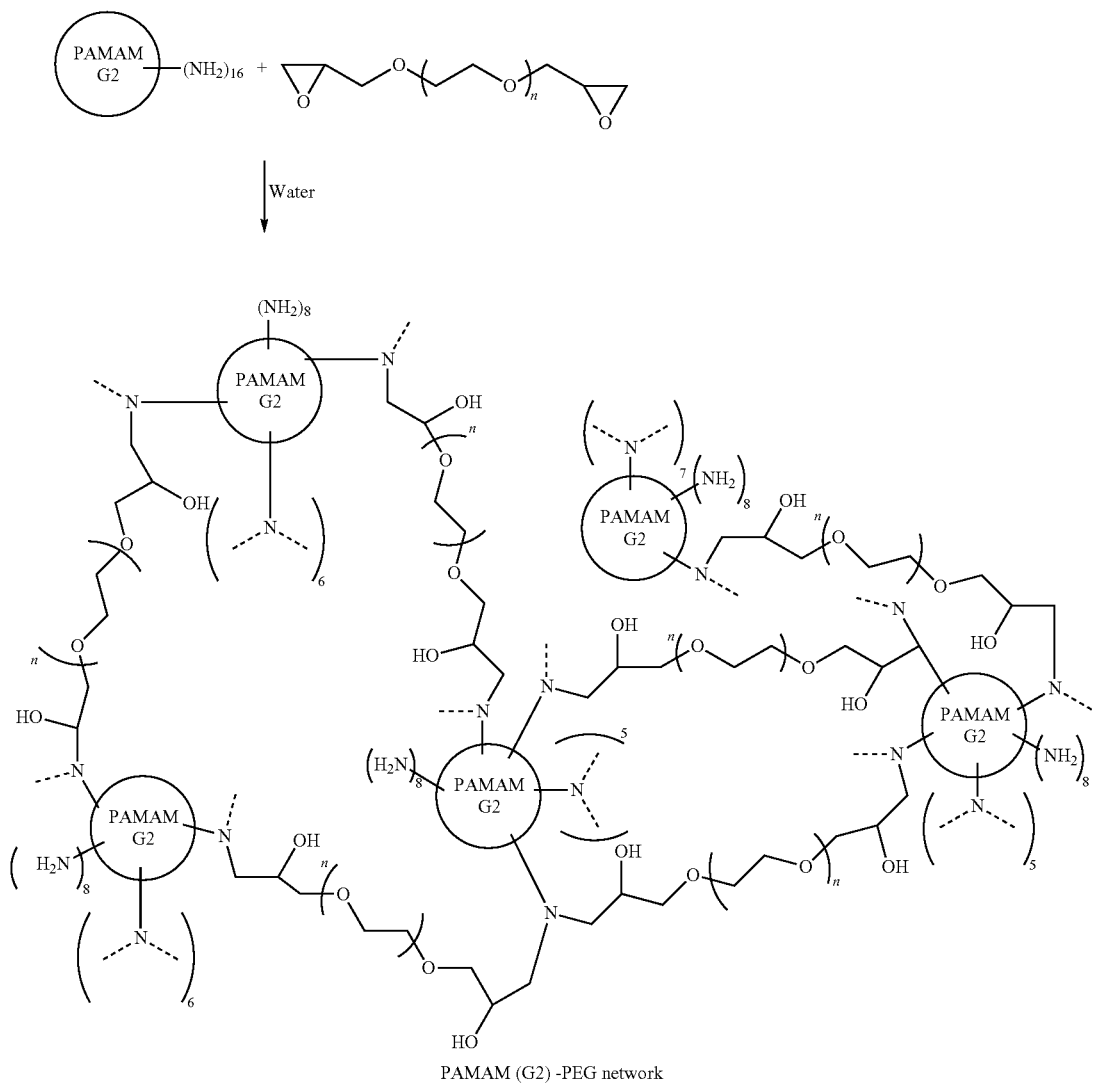

PAMAM (G2) -PEG network

Preparation of Network Coatings Using PAMAM (G2)-PEG Brush.

In another formulation, 50% of terminal $NH_2$ groups of the PAMAM (G2) dendrimer were grafted with NHS-PEG to form PAMAM (G2)-PEG star-like molecules referred here as PAMAM (G2)-PEG brush. This product was then reacted with PEG-DGE in water to provide a network coating that contained PEG brushes on its surface.

These brush-containing network coatings are intended to prevent the biofouling of the membranes by not allowing the biofoulants to settle on the membrane surface because of the high mobility of the brush chains. The reaction scheme for the formation of such PAMAM (G2)-PEG brush-PEG network is shown in Scheme 7 below.

Scheme 7

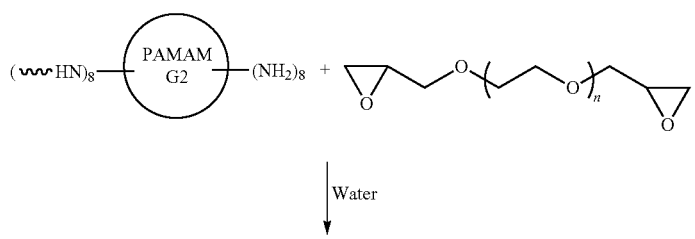

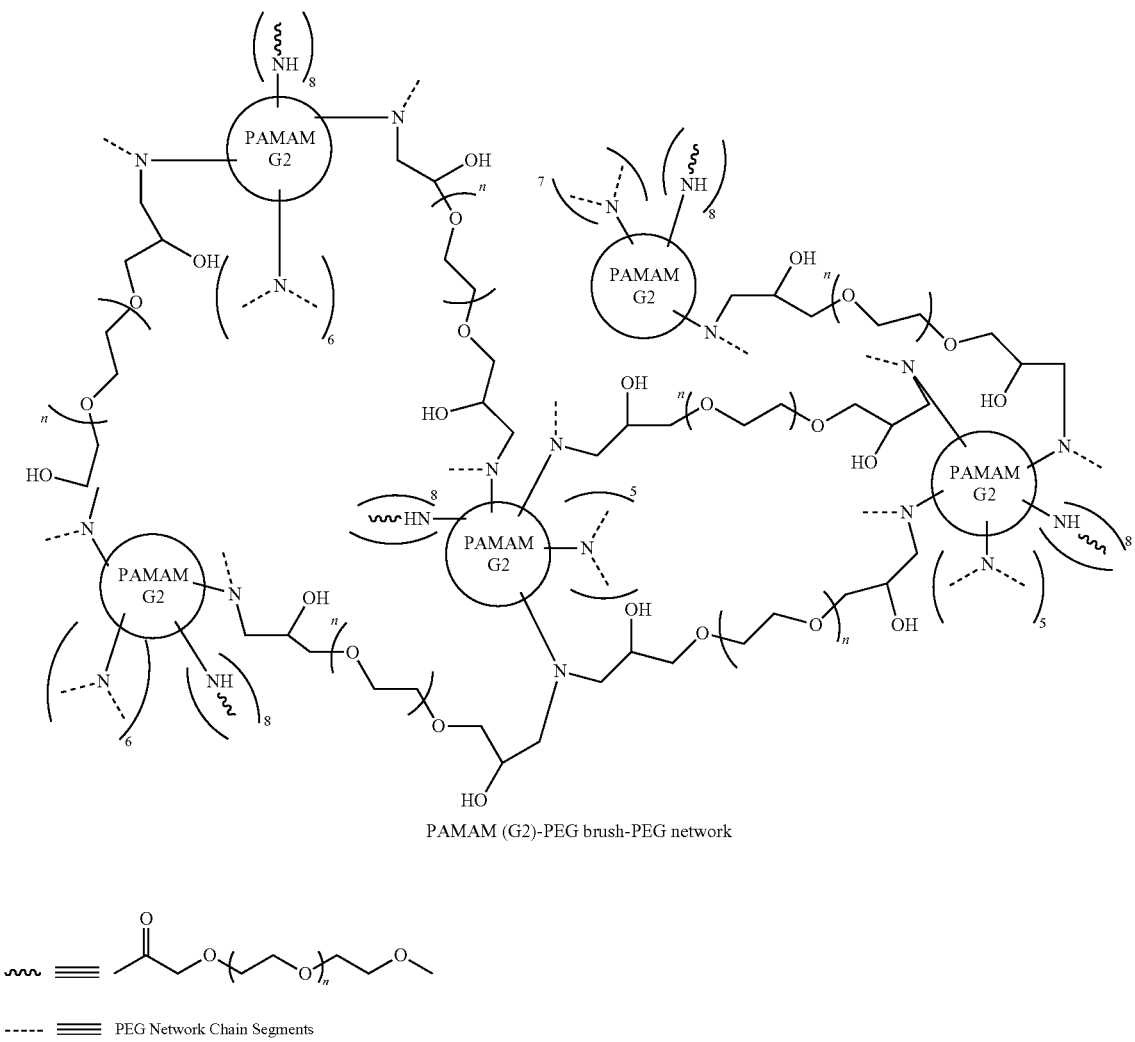

PAMAM (G2)-PEG brush-PEG network

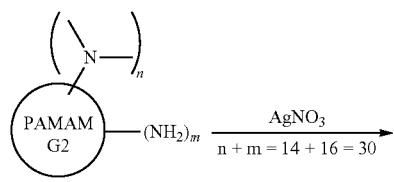

----- ≡≡≡ PEG Network Chain Segments

Preparation of Ag⁺ PAMAM (G2) Nanocomplexes.

PAMAM (G2) dendrimer was used to encapsulate $AgNO_3$, as shown in Scheme 8 below. In this scheme $(Ag^+)_n$ represents $Ag^+$ ions chelated to both primary (m=16) and tertiary (n=14) PAMAM (G2) amines, while $Ag^+$ represents intramolecularly chelated (i.e., encapsulated; chelated to tertiary amines only) species.

Scheme 8

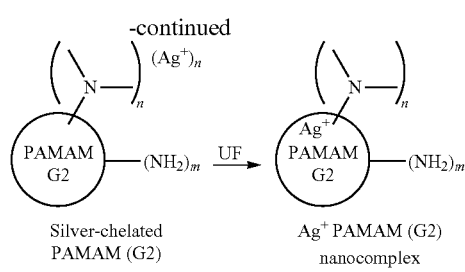

Silver-chelated PAMAM (G2) → Ag⁺ PAMAM (G2) nanocomplex

The obtained product was analyzed for quantitative determination of silver by ICP-OES, subjected to repeated UF (to eliminate the not-encapsulated; primary amines-bound silver) and the silver content was determined after every UF pass until a constant value of silver indicated the complete removal of not-encapsulated silver ions after six passes. Table 2 below summarizes the results from this preparation showing that silver content decreased with each UF pass and became constant after the fifth one.

TABLE 2

Elimination of non-encapsulated Ag⁺ ions by UF in DI water

| Number of UF passes | $Ag^+$ in the product (wt. %) | mmol of $Ag^+$/ mmol of total amines* |
|---|---|---|
| 0 | 38.0 | 0.616 |
| 1 | 22.6 | 0.293 |
| 2 | 20.9 | 0.266 |
| 4 | 18.3 | 0.225 |
| 5 | 15.9 | 0.190 |
| 6 | 16.0 | 0.191 |

*total amines = primary amines + tertiary amines

These data indicate that for every five amines (primary or tertiary) of PAMAM (G2), one $Ag^+$ was captured in a stable complex. This is lower relative concentration of $Ag^+$ than what would be expected if one $Ag^+$ complexed to each intra-dendrimer tertiary amine as shown in Scheme 8 (which would correspond to one $Ag^+$ for every 2.1 PAMAM (G2) amines), and from ICP-OES data it was not possible to ascertain whether the silver ions were chelated to the tertiary or to the primary amines or both.

Preparation of Network Coatings Using $Ag^+$ PAMAM (G2) Nanocomplexes.

$Ag^+$ PAMAM (G2) nanocomplexes of Scheme 8 were reacted with PEG-DGE in water to provide a network coating. This reaction to form networks with 50% free terminal amines is shown in Scheme 9 below.

Scheme 9

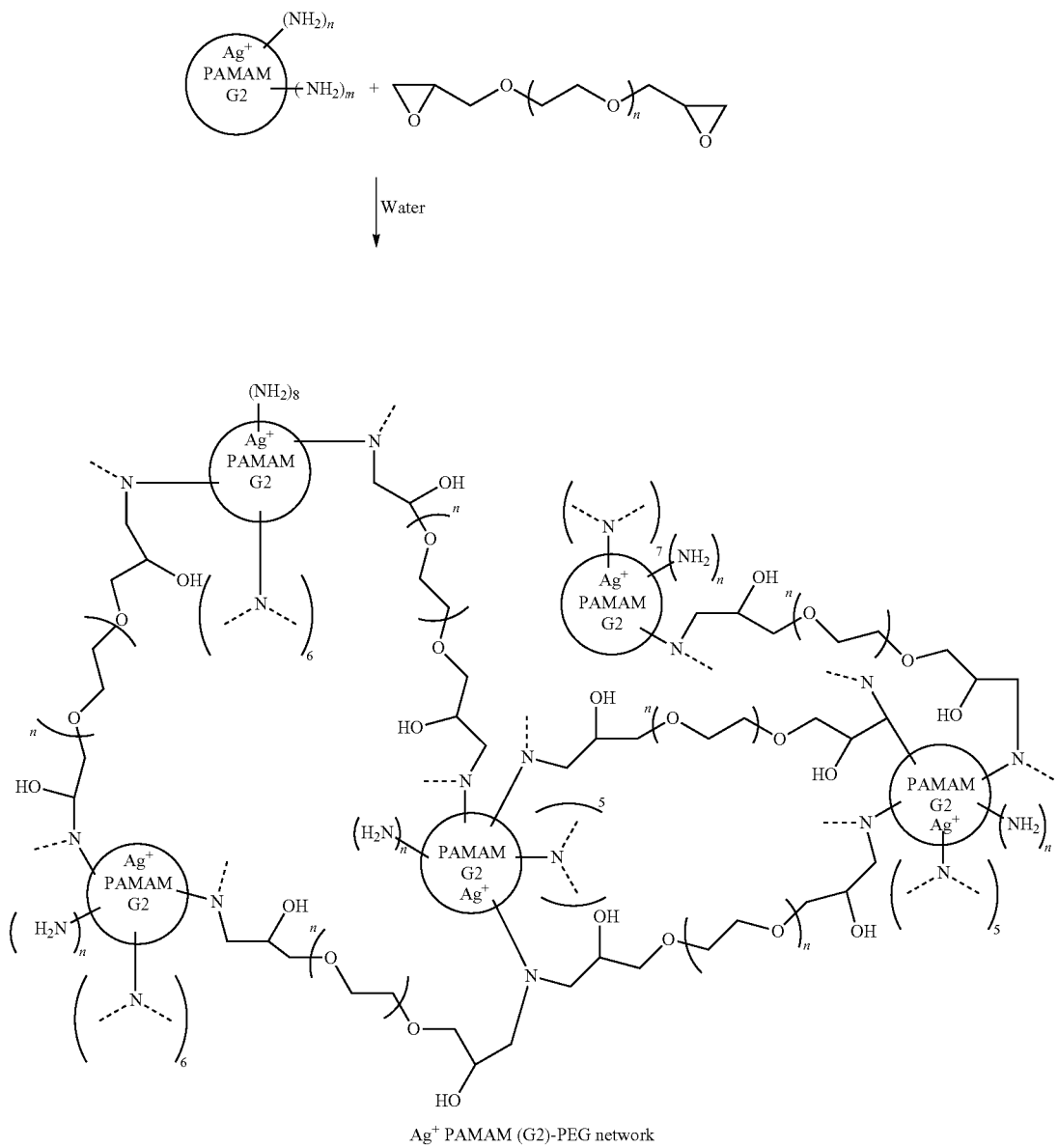

$Ag^+$ PAMAM (G2)-PEG network

Preparation of Network Coatings Using Ag+ PAMAM (G2)-PEG Brush Nanocomplexes.
Ag+ PAMAM (G2)-PEG brush nanocomplexes were reacted with PEG-DGE in water to provide a network coating. This reaction to form networks is shown in Scheme 10 below.
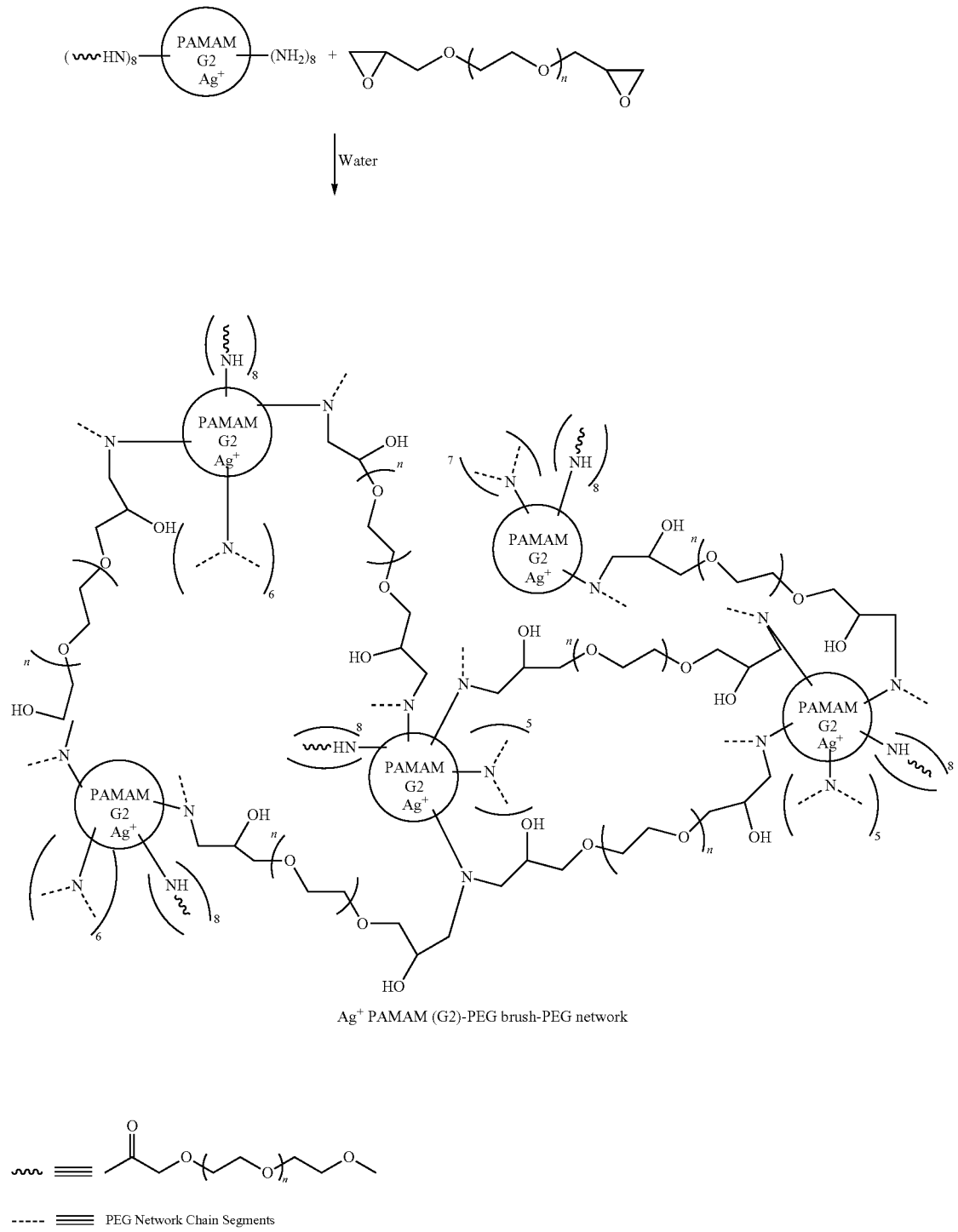

These coatings provide membranes with three-fold protection against biofouling: if the surface hydrophilicity is overwhelmed by the biofoulants, and the mobility of brushes fails to prevent them from settling, the silver ions, with their biocidal activity, provide further protection.

These above Schemes are intended to illustrate some methods to make the various coatings for use in this invention. Similar methods can be used to make the other coatings of this invention.

EXAMPLES

Equipment and Methods

Differential Scanning Calorimetry (DSC)
DSC was run on a DuPont 912 Differential Scanning Calorimeter.
Inductively Coupled Plasma Optical Emission Spectrometry (ICP-OES)
ICP-OES was used for silver ion analysis.
Infrared Spectra (FTIR)
Infrared spectra were obtained on a Nicolet 20 DBX FTIR spectrometer either as a neat liquid on polished KBr plates, or if the sample was a solid, as KBr pellets.
MALDI-TOF Mass Spectrometry
Mass spectra were run on a PerSeptive Biosystems Voyager-STR MALDI-TOF.
Nuclear Magnetic Resonance (NMR)-$^1$H-NMR
Sample preparation: Samples were dissolved in $CDCl_3$ with tetramethylsilane as the internal reference standard unless otherwise stated.
Equipment: $^1$H-NMR spectra were obtained on a Varian 400 MHz NMR spectrometer.
Size Exclusion Chromatography (SEC)
SEC was run on a Waters size exclusion chromatograph with narrow molecular weight distribution polystyrene standards. Eluents were either toluene or chloroform. The column was a PLgel 34-2/34-5.
Scanning Electron Microscopy (SEM)
SEMs were recorded on an Amray scanning electron microscope with an energy dispersive X-ray detector used as required.
Thermogravimeteric Analysis (TGA)
TGA was run on a Dupont 951 Thermogravimetric Analyzer.
All commercial starting chemicals were used as received from the supplier unless otherwise specified. All commercial solvents were at a minimum ACS reagent grade and used as received.
PAMAM (G2) dendrimers were purchased from Dendritech, Inc., Midland, Mich., and used as received.
The polyamide-based RO membranes (LE and XLE) were obtained from FilmTec, Inc.
The invention will be further clarified by a consideration of the following examples, which are intended to be purely exemplary of the present invention.
The following lettered examples are directed to the preparation of starting materials.

Example A

Preparation of Hyperbranched Polyamide from Tris-(Aminoethyl)Amine and Dimethyl Succinate (HB-Pamsuc)

A 500 mL 3-neck round-bottomed flask was fitted with an overhead stirrer, a Barret trap and a condenser. TREN (103 g, 0.704 mol) was added to the flask, followed by dimethyl succinate (77.1 g, 0.514 mol). The flask was heated overnight at 110° C. in an oil bath. Upon cooling, the viscous yellow product was dissolved in 100 mL of chloroform and precipitated by addition of diethyl ether (2×750 mL). The ether layer was discarded and all of the volatiles were removed under reduced pressure to yield 152 g (84%) of the title product.

Example B

Synthesis of N-hydroxysuccinimide Derivative of Methoxypolyethyleneglycol Acetic Acid (NHS-PEG)

In a 250 mL round-bottom flask equipped with a nitrogen inlet and outlet, a dropping funnel and a magnetic stir bar, EDC (1.31 g, 6.83 mmol) and N-hydroxysuccinimide (0.780 g, 6.78 mmol) were added and the flask was placed on a magnetic stirrer. Methylene chloride (120 mL) was added to dissolve the reagents in the flask. MPEG (4.09 g, 6.739 mmol) was added to the stirred solution, drop-wise over 6 min. After stirring at RT for 42 hr, the reaction mixture was transferred to a 1-neck flask and the solvent was removed on a rotavap. The residue was dissolved in water and extracted 4 times with chloroform (4×200 mL). The resultant chloroform extract was washed with 500 mL of saturated sodium bicarbonate solution, followed by DI water (2×250 mL). The organic extract was dried over anhydrous sodium sulfate, filtered, and the solvent stripped under reduced pressure on a rotavap to obtain 1.316 g (49%) of a yellowish solid product. Its spectra were as follows:

$^1$H NMR ($CDCl_3$): δ 3.50 (s, PEG backbone); 3.21 (s, —$OCH_3$), 2.81 (s, succinimide, 4H), 2.63 (m, $CH_2CH_2$, 4H).

Example C

Synthesis of PAMAM (G2)-PEG

NHS-PEG (1.316 g) was placed in a 100 mL round-bottom flask and dissolved in 25 mL of methylene chloride. A methanolic solution of PAMAM G2 (0.7608 g in 3.55 mL of MeOH, 0.2337 mmol. 3.74 mmol eq. $NH_2$) was slowly pipetted into the reaction mixture with stirring. This mixture was stirred at RT for 48 hr to allow the NHS-PEG to react stoichiometrically with half of the surface amine groups. The solvent was then removed under reduced pressure and the product subjected to UF with 1000 Dalton nominal MWCO regenerated cellulose membrane in MeOH. The solution after UF was stripped under reduced pressure on a rotavap to yield 1.2793 g (64%) of a caramel colored solid product. Its spectra were as follows:

$^1$H NMR ($CDCl_3$): δ 7.95 (s, —$CONHCH_2CH_2N$=), 6.41 (d, —NHCONH—), 5.91 (D, —$NHCO\overline{N}H$—), 4.30 (d, —C$\overline{H}CH$—), 4.15 (D, —$CH\overline{C}H$—), 3.50 (s, PEG backbone), 3.21 (s, —$OCH_3$), 2.63 (m, $CH_2CH_2$, 4H), 2.51-2.46 (m, —$CONHCH_2\underline{CH}_2N$=), 1.61 (b), 1.43 (b), 1.23 (s, —$CH_3$); and
FTIR (KBr): $v_{max}$ $cm^{-1}$ 3263 (—NH), 1650 (—C=O), 1547 (—CNH of amide).

Example D

Preparation of Silver Ion-PAMAM (G2) Nanocomplex

PAMAM (G2) (0.2 g) was weighed into a 100 mL round-bottom flask, and water (20 mL) and $AgNO3$ (0.2 g) were added with stirring. The clear solution was transferred into an UF cell equipped with a 1000 Dalton nominal MWCO regenerated cellulose membrane, water was added as solvent and the product was purified by 3 passes. Water was removed on a rotavap, under reduced pressure the solid product was re-dissolved in water and again subjected to UF and the retentate was characterized for silver after each pass by elemental analysis using ICP-OES. Each time, 300 mL of water was used to make up the solution. UF was repeated 6 times and a sample obtained from each UF cycle retentate was taken for quantitative determination of silver. See data in Table 2 above.

The following numbered examples are directed to the coatings of the present invention.

Example 1

General Procedure for Preparation of HBP-PEG and PAMAM-PEG Network Coatings A rectangular section of approximately 19 cm×23 cm of a FilmTec™ RO membrane was cut from a continuous roll stock and the protective glycerin coating was removed by washing in a DI water bath. The membrane was then affixed to a glass plate of similar dimensions via masking tape at the four corners making sure that it was flat against the plate. DI water was sprayed between the membrane and the glass plate to ensure that the uncoated polyester "bottom" side of the membrane remained wet. The exposed polyamide "top" surface was also washed with DI water. Coating solution was prepared with desired weight percents of dendritic polymer used and stoichiometric eq. of PEG-DGE in water. The solution was poured onto the membrane to cover the entire surface and allowed to polymerize for 30 sec in a stationary horizontal position. Afterward an aluminum roller was rolled over the membrane 2 times with little to no vertical pressure to remove the excess solution.

The network coatings used in the following examples were prepared by this general procedure and the components may be altered.

The following examples are directed to the methods used for characterization of the coatings of this invention.

Example 2

Coating Coverage Evaluation

Figure 6:
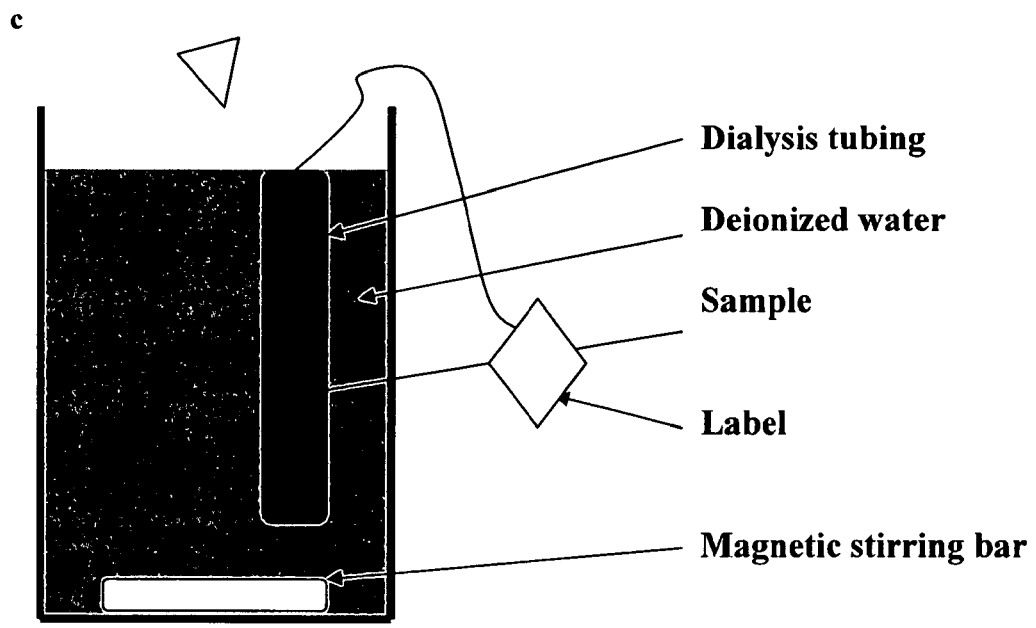
FIG. 6 is a schematic of the dialysis set-up used to prepare each of the dye coating mixtures.

A series of standard dyes and markers were used to evaluate the membrane coverage with coatings in this study. They were each added to a solution of PAMAM (G2) dendrimer in water at a level of 1.0 wt. %. The following coating markers were mixed on a rotary mixer for 120 mins.:

(1) Green food dye
(2) Fluorescein
(3) Copper acetate
(4) Copper thiocyanate
(5) Thymol blue
(6) Methyl violet blue All of the markers readily dissolved except for methyl violet blue; the non-dissolved portion of which was decanted off and disposed. All mixtures were filtered using No. 2 filter paper and then transferred into a tube of Spectra/POR® CE Cellulose Ester Membrane MWCO 500 for 36 hr dialysis in DI water to remove any unbound excess markers (see FIG. 6).

A strip of RO membrane was attached to a glass backing with masking tape to ensure a flat surface. The membrane was soaked in DI water for 5 mins, the water was changed, and the membrane was soaked again for additional 5 mins. The PAMAM coating solutions were applied along with stoichiometric amounts of PEG-DGE at the center of the membrane strip using a cotton swab, while ensuring that the top and bottom portions of the strip remained uncoated. The coated parts were examined visually and then allowed to dry overnight.

Figure 7:
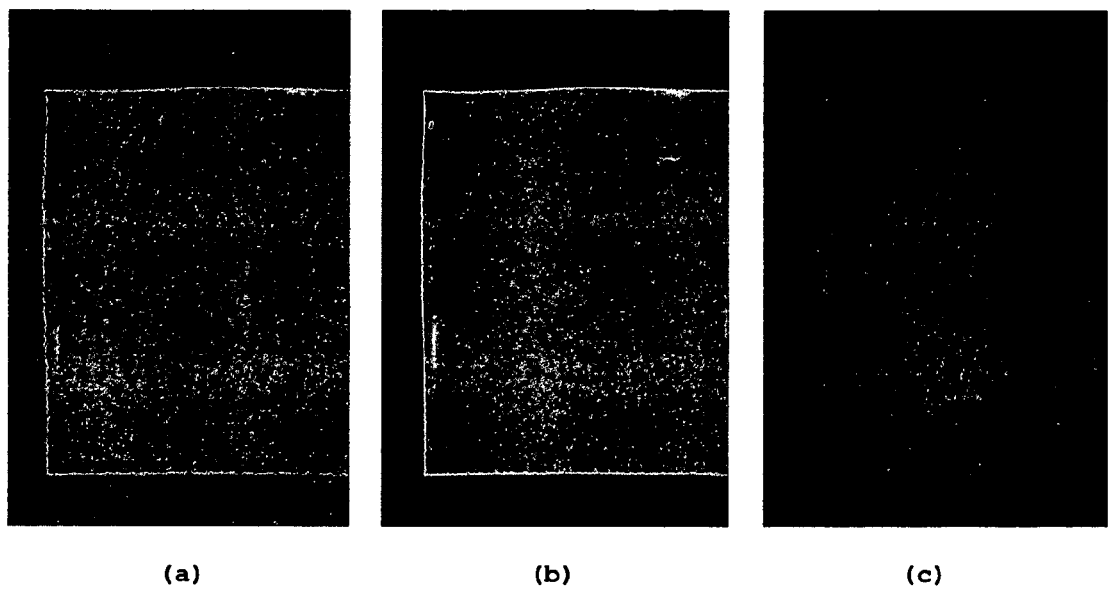
FIG. 7 shows a G2 PAMAM coating painted in a cross shape on FilmTec's Low Energy (LE) membrane where: Part (a) is viewed under normal light conditions; Part (b) is viewed under normal light conditions but after the membrane was left to develop and dry overnight; and Part (c) is viewed under a UV light source.

The coatings could be differentiated from uncoated regions with differing degrees of ease. Fluorescein (2), thymol blue (5), and green food dye (1) produced colored deposits that could be easily differentiated from the uncoated regions, while coatings with other markers (3, 4, and 6) resulted in clear deposits that were less easy to differentiate from uncoated regions. The ability to identify coated regions was greatly enhanced by viewing under UV light in all cases, particularly if the membranes were allowed to dry overnight. FIG. 7 shows an example of the visible differences between the coated and uncoated regions.

Example 3

Effect of Concentration of the Coating Solution

To determine the minimum concentration of the casting solution for continuous coverage of the membrane surface, evaluation under 254 nm UV light was used after 4 hours of drying the coated membrane in air. The coating exhibited a faint green fluorescence while the uncoated polyamide surface was blue. Satisfactory coating with uniform coverage was achieved from the PAMAM (G2) solutions ranging from 0.5 to 1 wt %.

Example 4

Surface Morphology

Figure 8:
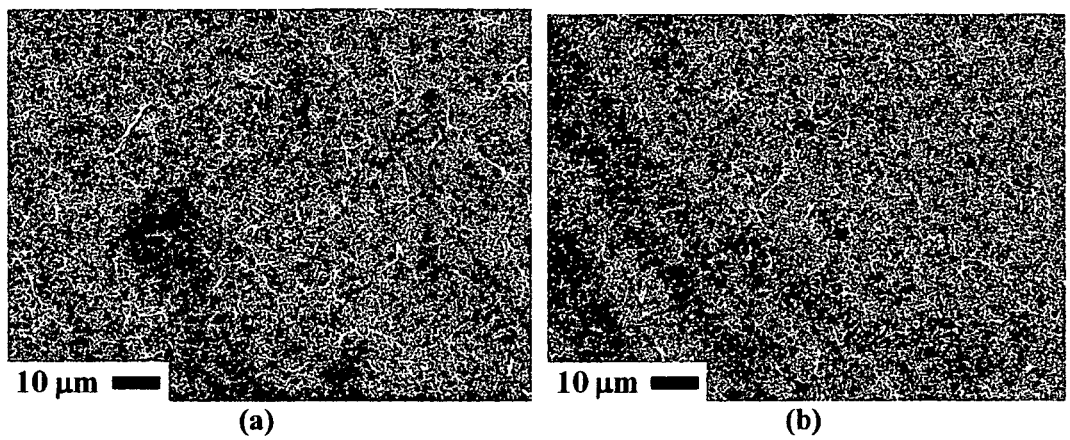
FIG. 8 shows SEM micrographs of (a) the polyamide surface of an uncoated LE membrane, and (b) an LE membrane coated with 3 wt. % PAMAM G2 and a stoichiometric amount of PEG-DGE in water with no free terminal amines.

A number of samples were evaluated by SEM in order to examine the surface morphology of membranes after coating. It was found that both the original polyamide surfaces and the coated surfaces were quite similar in terms of their physical homogeneity (FIG. 8). Physical irregularities were more pronounced on the polyamide surfaces than on the polymer coated surfaces. The improved smoothness of the coated membrane probably contributes to antifouling characteristics to some degree, although, any such improvement would likely be dwarfed by the improvements caused by increased hydrophilicity of the membranes, which is believed to be the fundamental factor for enhanced antifouling behavior.

Example 5

Evaluation of Membrane Hydrophilicity—Determination of Advancing Water Contact Angle (AWCA)

The AWCA of DI water on the coated membranes was measured using KSV Instruments CAM 200. Dry membranes were placed on the test stand and affixed via two-sided adhesive tape. A 0.01 mL drop of water was metered out of the dispenser tip and slowly brought in contact with the surface, whereupon it was pulled away from the dispenser tip by the surface. AWCA values were measured in one of two ways. In one method, dynamic measurements were performed by taking droplet images first rapidly, 33 milliseconds apart, and then slowing down to one sec intervals when the drop shape stabilized, while in another method, a single image was taken 5 sec after the water droplet was placed in contact with the surface. In either case, AWCA values were calculated using the Young-Laplace fitting equation under conditions which allowed for tilt and an automatic baseline. It was found that the contact angles for the surfaces modified with HBP-PEG based coatings were lower by about 15° than those of uncoated RO membranes, while the decrease in contact angles for the PAMAM-based coatings were even more dramatic as is summarized in Table 3 below for the $Ag^+$-PAMAM (G2)-PEG coatings. The presence of free amines in the coatings had little effect on their hydrophilicity. The contact angles quoted are average values obtained from eight to ten measurements.

TABLE 3

Advancing water contact angle values of coated and uncoated FilmTec © membranes

| Coating | FilmTec membrane | Contact angle (°) |
| --- | --- | --- |
| Uncoated membrane | LE | 81 |
|  | XLE | 62 |
| $Ag^+$-PAMAM (G2)-PEG with 50% free amines | LE | 24 |
|  | XLE | 22 |
| $Ag^+$-PAMAM (G2)-PEG with no free amines | LE | 27 |
|  | XLE | 17 |

Example 6

General Procedures for Evaluation of Membrane Separation Properties

Figure 9:
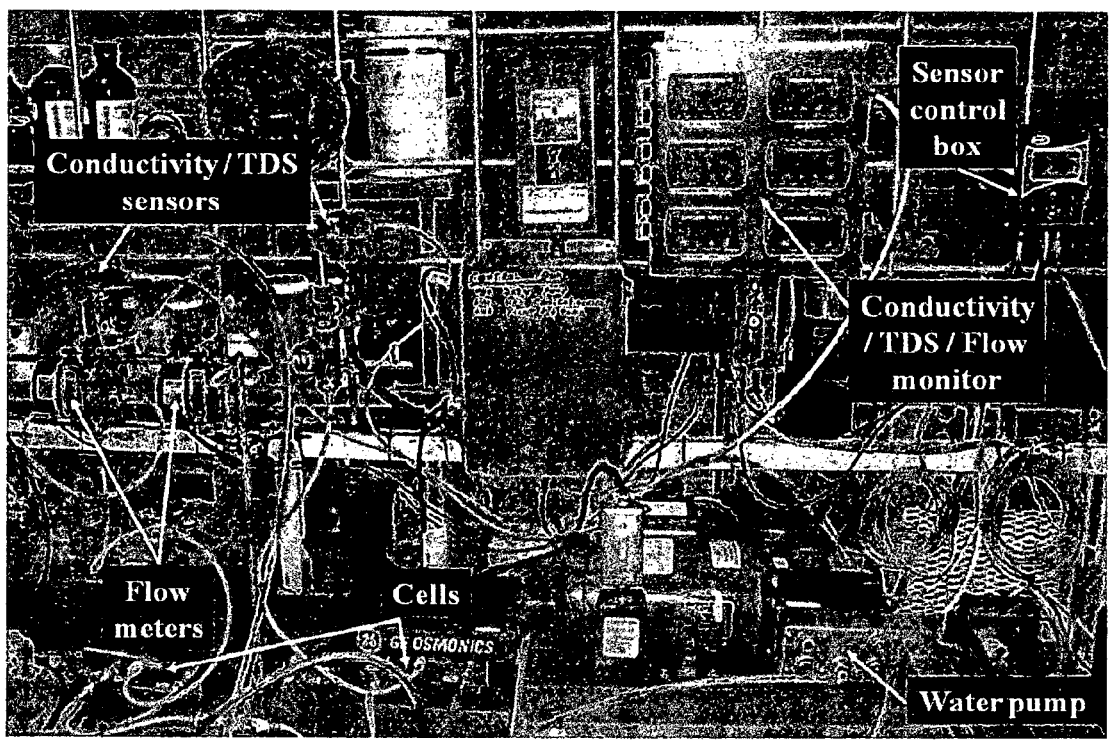
FIG. 9 shows a SEPA CF II dual cell testing system set-up for evaluation of the separation properties of flat sheet RO membranes.

FIG. 9 shows the SEPA CF II (GE Osmonics) dual cell system set-up used for these evaluations. The cells were connected in parallel, allowing for comparative evaluations of pairs of membranes. The system was equipped with an automated data collection unit for obtaining permeate flux and salt rejection values as a function of time. This dual cell set-up was calibrated using standard FilmTec LE RO membranes with known performance parameters.

Permeate flux and rejection % were determined as follows. Eighty gallons of 1,000 ppm aqueous NaCl (pH ~6.3) in DI water was placed in the reservoir connected to the SEPA CF II test cell system and the membranes were exposed to this solution for 15 min at ambient pressure. Following this, a pressure of 100 psi was applied and measurements were recorded every 30 min for several hours. Flux was determined as the number of mL of permeate per min; while rejection was measured from the concentration of total dissolved solids (TDS) in ppm as determined from the conductance in micro Siemens for the permeate and the reservoir water, respectively.

Example 7

Evaluation of Membrane Separation Properties

The measured values for salt rejection for uncoated LE and XLE RO membranes were over 98% at 100 psi operating pressure, and the permeate fluxes were 13 mL/min and 14 mL/min, respectively. These values agree well with the manufacturer's specifications.

Tables 4 to 7 below summarize the experimental results obtained for the surface modified XLE membranes with four different types of dendritic polymer network coatings of this invention. It can be seen from these data that these modifications significantly increased surface hydrophilicity of the uncoated membranes (as indicated by the corresponding decrease of AWCA values by 25 to 30°. The flux and exclusion numbers listed in the tables were the averages of two independent measurements. The AWCA values are the averages of eight to ten measurements. In all cases 0.5 wt % coating solutions were used.

TABLE 4

Properties of XLE membranes with PAMAM (G2)-PEG coating

| Coating | Sample | Flux (mL/min) | Salt Rejection (%) | Contact angle (°) |
| --- | --- | --- | --- | --- |
| Uncoated membrane | — | 14.0 | 99.0 | 60 |
| PAMAM (G2)-PEG with 50% free amines | 1 | 11.1 | 99.0 | 34 |
|  | 2 | 12.1 | 98.0 | 34 |
|  | 3 | 10.6 | 99.0 | 33 |
|  | 4 | 10.4 | 99.0 | 36 |
|  | 5 | 11.9 | 99.0 | 36 |
|  | Average | 11.2 | 98.8 | 35 |

The membrane coating containing the PAMAM (G2)-PEG network with 50% of the PAMAM amines unreacted (Table 4) provided a 25° reduction of contact angle over the uncoated membranes without compromising the salt exclusion and with flux reduction of about 20% which was well within the benchmark level reported by various research and industrial groups [Toki, S. et al., *Polymer* 44, 6003 (2003)].

When the remaining 50% of free amines left unreacted in the above mentioned formulation were reacted to introduce PEG brushes, the results were more dramatic as far as the surface hydrophilicity was concerned (see Table 5 below). The reduction in contact angle was 42° over the uncoated membranes with negligible reduction in percentage salt rejection, and again about 20% flux reduction.

TABLE 5

Properties of XLE membranes with PAMAM (G2)-PEG brush-PEG coating

| Coating | Sample | Flux (mL/min) | Salt Rejection (%) | Contact angle (°) |
| --- | --- | --- | --- | --- |
| Uncoated membrane | — | 14.0 | 99.0 | 60 |
| PAMAM (G2)-PEG brush-PEG | 1 | 13.0 | 99.0 | 15 |
|  | 2 | 10.0 | 99.0 | 19 |
|  | 3 | 11.4 | 97.0 | 15 |
|  | 4 | 10.5 | 98.0 | 19 |
|  | 5 | 10.0 | 99.0 | 18 |
|  | 6 | 11.3 | 99.0 | 21 |
|  | Average | 11.0 | 98.5 | 18 |

A surface coating with 50% free amino groups and chelated silver ions exhibited about the same hydrophilicity as the corresponding coating without $Ag^+$ (see Table 4) as shown in Table 6 below. The rejection was comparable to the corresponding coatings without $Ag^+$ but the permeate flux was only about 10% lower.

TABLE 6

Properties of XLE membranes with Ag$^+$-PAMAM (G2)-PEG coating

| Coating | Sample | Flux (mL/min) | Salt Rejection (%) | Contact angle (°) |
|---|---|---|---|---|
| Uncoated membrane | — | 14.0 | 99.0 | 60 |
| Ag$^+$-PAMAM (G2)-PEG with 50% free amines | 1 | 12.2 | 98.0 | 32 |
| | 2 | 12.7 | 99.0 | 31 |
| | 3 | 9.1 | 98.0 | 31 |
| | 4 | 13.3 | 98.0 | 29 |
| | 5 | 12.6 | 98.0 | 32 |
| | 6 | 12.3 | 98.0 | 35 |
| | 7 | 14.3 | 98.0 | 26 |
| | Average | 12.4 | 98.1 | 31 |

Finally, when silver was introduced into the coating that contained PEG brushes and no free amines, the highest hydrophilicity was exhibited by the membrane surfaces (see Table 7 below). This coating provided a 45° reduction of contact angle relative to the uncoated membranes without compromising on salt rejection. The flux was reduced by an acceptable value of ca. 20%.

TABLE 7

Properties of XLE membranes with Ag$^+$-PAMAM (G2)-PEG brush - PEG coating

| Coating | Sample | Flux (mL/min) | Salt Rejection (%) | Contact angle (°) |
|---|---|---|---|---|
| Uncoated membrane | — | 14.0 | 99.0 | 60 |
| Ag$^+$-PAMAM (G2)-PEG brush-PEG | 1 | 10.0 | 99.0 | 18 |
| | 2 | 13.0 | 99.0 | 15 |
| | 3 | 10.8 | 97.0 | 13 |
| | 4 | 16.0 | 99.0 | 14 |
| | 5 | 10.6 | 99.0 | 14 |
| | Average | 11.0 | 98.6 | 15 |

The above described separation properties of these XLE RO membranes with various coating formulations are summarized in Table 8 below. A closer analysis of the data strongly indicates that hydrophilicity can be controlled by manipulation of the membrane surface coating formulations. PEG brushes play a significant role in enhancing the hydrophilicity and introduction of chelated silver ions does not compromise the separation properties of the resultant membranes.

TABLE 8

Summary of data from Tables 4-7

| Sample | Mean contact angle (°) | Salt rejection (%) | Flux (mL/min) |
|---|---|---|---|
| Uncoated Commercial Membrane | 60 ± 10 | 99 | 14.0 ± 2.0 |
| Membrane w/dendritic base coating | 35 ± 2 | 98.8 ± 0.8 | 11.2 ± 0.9 |
| Membrane w/dendritic base coating including additives (Ag$^+$) | 31 ± 3 | 98.1 ± 1.6 | 12.4 ± 1.6 |
| Membrane w/dynamic (brush) dendritic coating | 18 ± 2 | 98.5 ± 0.8 | 11.0 ± 0.9 |
| Membrane w/dynamic (brush) dendritic coating including additives (Ag$^+$) | 15 ± 3 | 98.6 ± 1.5 | 12.2 ± 2.0 |

The uncoated, commercial membranes are the first entry. Entries 2-4 are coatings when only one component is present of the claimed coating of this invention. It can be seen that the coating of the present invention has a lower contact angle, with little effect on the salt rejection or decrease in flux. Thus the coatings of this invention can provide a longer life to a coated RO membrane by reducing biofouling, while providing the needed utility of RO membranes and reducing energy use.

Although the invention has been described with reference to its preferred embodiments, those of ordinary skill in the art may, upon reading and understanding this disclosure, appreciate changes and modifications which may be made which do not depart from the scope and spirit of the invention as described above or claimed hereafter.

What is claimed is:

1. A composition of matter which comprises a crosslinked hydrophilic coating on a surface of a reverse osmosis membrane wherein the coating comprises hydrophilic dendritic polymers selected from the group consisting of a hyperbranched polyamide as a succinate derived from TREN and MeOOC—(CH$_2$)$_2$—COOMe and a PAMAM dendrimer, wherein the dendritic polymer (a) is crosslinked to form a polymer network, and (b) is modified with hydrophilic linear chains to form polymer brushes in the network.

2. The composition of claim 1 wherein the reverse osmosis membrane is a polyamide membrane.

3. The composition of claim 1 wherein the PAMAM dendrimer is a G2.

4. The composition of claim 1 wherein the dendritic polymer in the coating is crosslinked with polyethylene glycol.

5. The composition of claim 4 wherein the advancing water contact angle of the network surface was reduced by at least 15° compared to uncoated membranes.

6. The composition of claim 1, wherein the dendritic polymer in the coating is modified with polyethylene glycol as the hydrophilic linear chain to form polymer brushes.

7. The composition of claim 6 wherein the advancing water contact angle of the network surface was reduced by at least 10° compared to the coating without polymer brushes.

8. The composition of claim 1 wherein the polymer network has been modified by chelating antimicrobial metal ions into it.

9. The composition of claim 8 wherein the antimicrobial metal ions are silver, potassium or zinc.

10. The composition of claim 1 wherein the salt rejection of the reverse osmosis membrane is at least 94%.

11. A method of using the composition of any one of claims 1-10 wherein the coating reduces biofouling of the membrane.

* * * * *